April 12, 1966  L. J. MAURER  3,245,122
APPARATUS FOR AUTOMATICALLY DIE-CASTING WORKPIECES
OF SYNTHETIC PLASTIC MATERIAL
Filed May 1, 1962  9 Sheets-Sheet 1
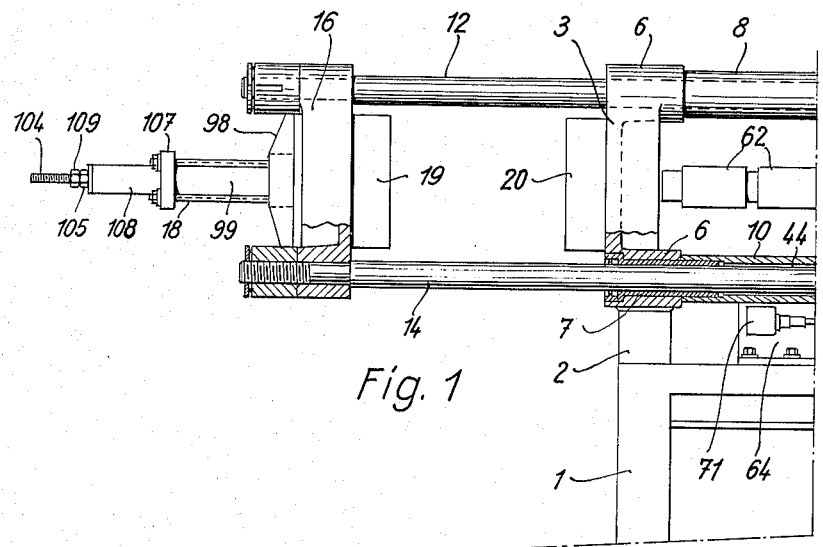
Fig. 1
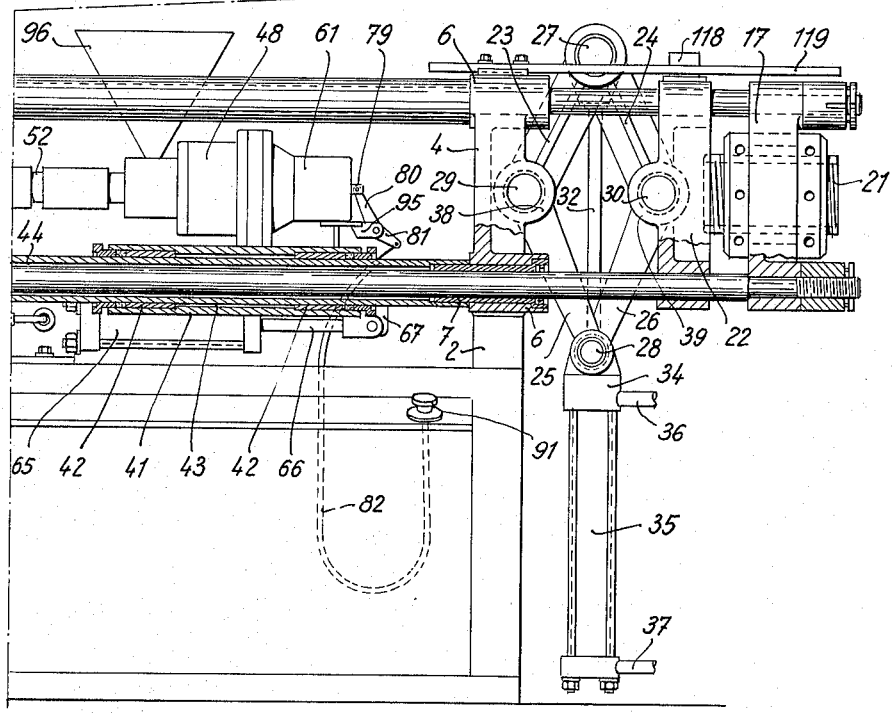
Inventor:
Ludwig Josef Maurer
by Michael S. Striker
Attorney April 12, 1966  L. J. MAURER  3,245,122
APPARATUS FOR AUTOMATICALLY DIE-CASTING WORKPIECES
OF SYNTHETIC PLASTIC MATERIAL
Filed May 1, 1962  9 Sheets-Sheet 2
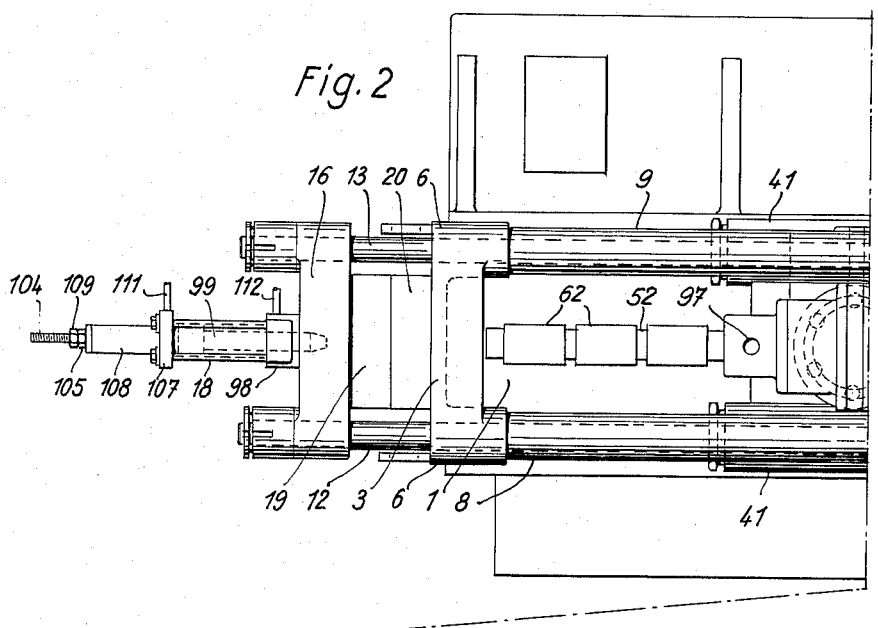
Fig. 2
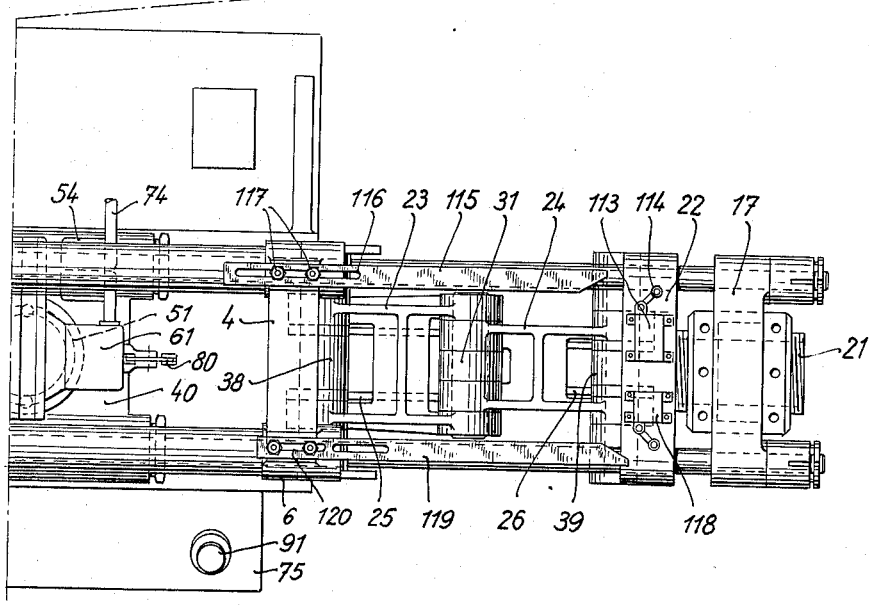
Inventor
Ludwig Josef Maurer
by Michael S. Striker
Attorney

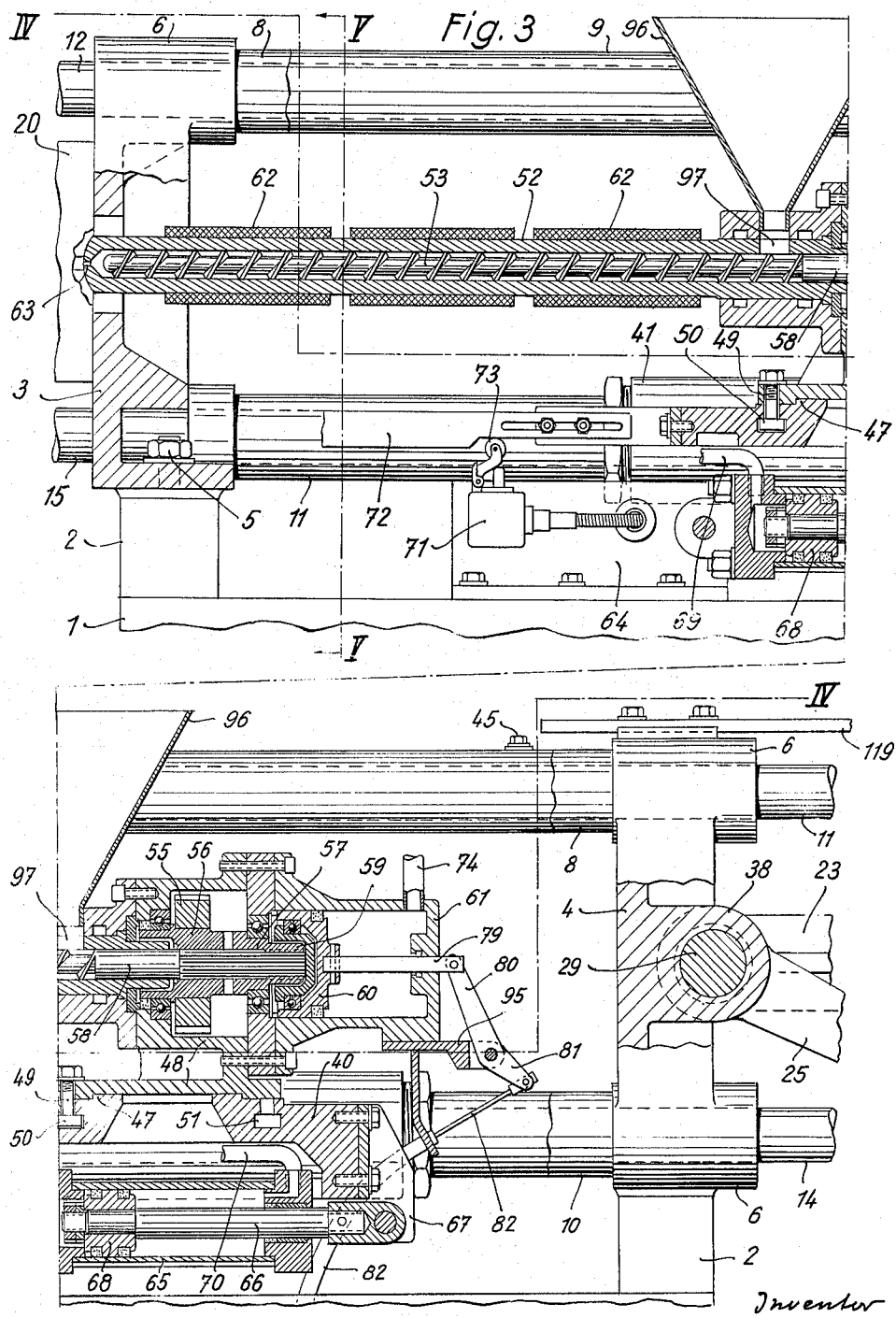

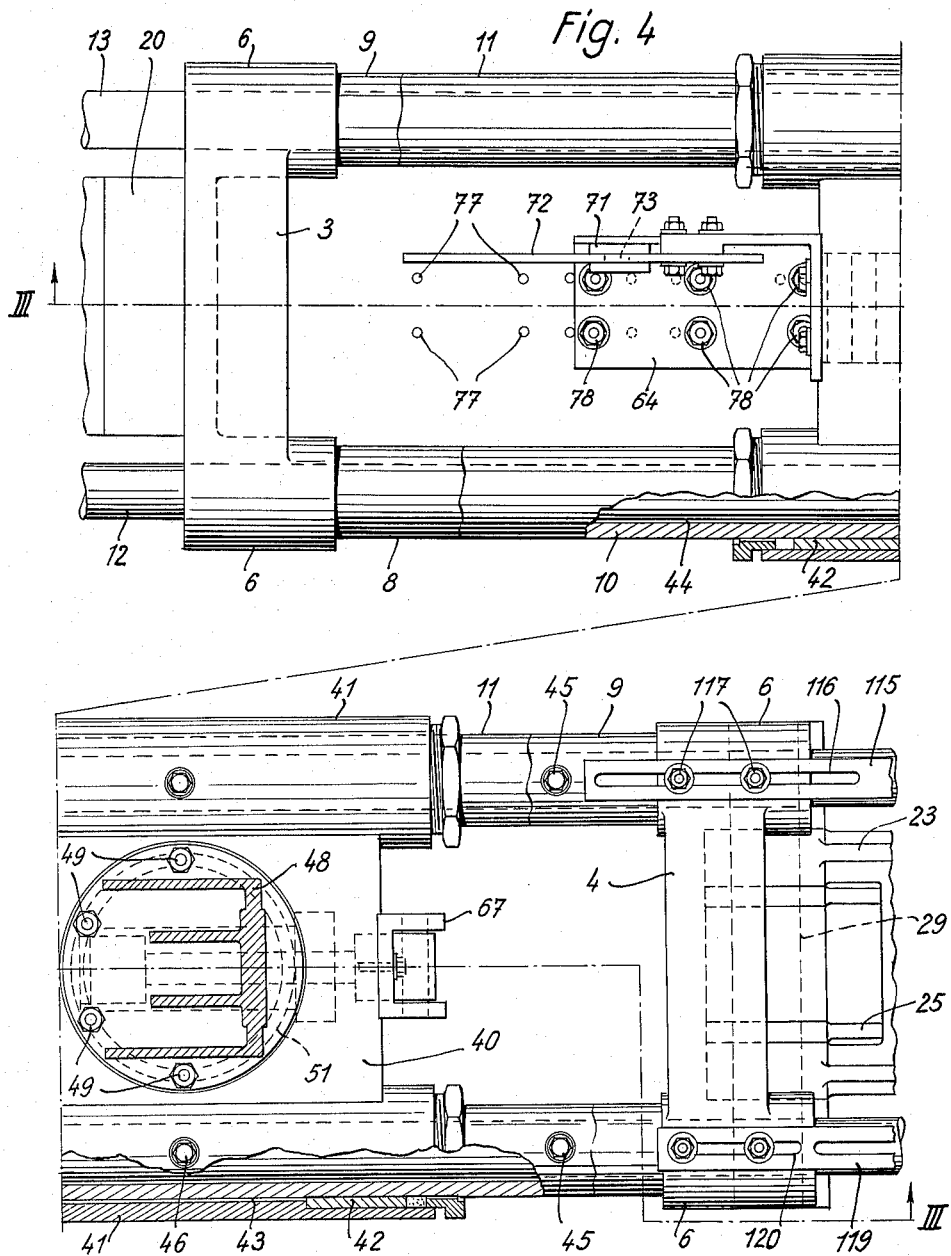

April 12, 1966   L. J. MAURER   3,245,122
APPARATUS FOR AUTOMATICALLY DIE-CASTING WORKPIECES
OF SYNTHETIC PLASTIC MATERIAL
Filed May 1, 1962   9 Sheets-Sheet 5
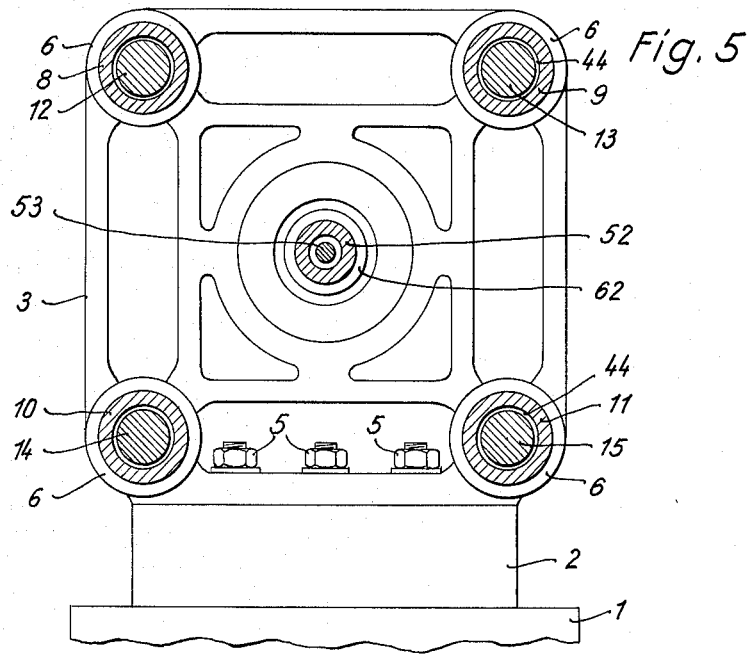
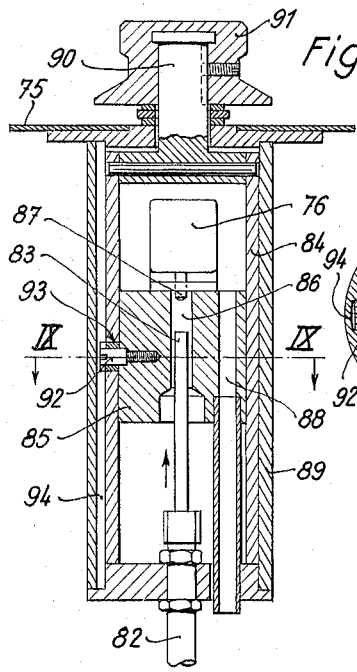
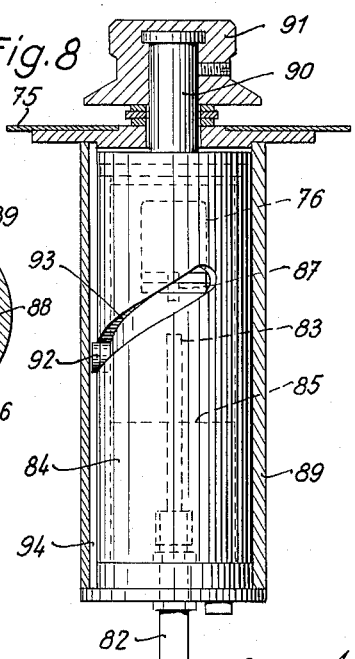
Inventor:
Ludwig Josef Maurer
by Michael S. Striker
Attorney

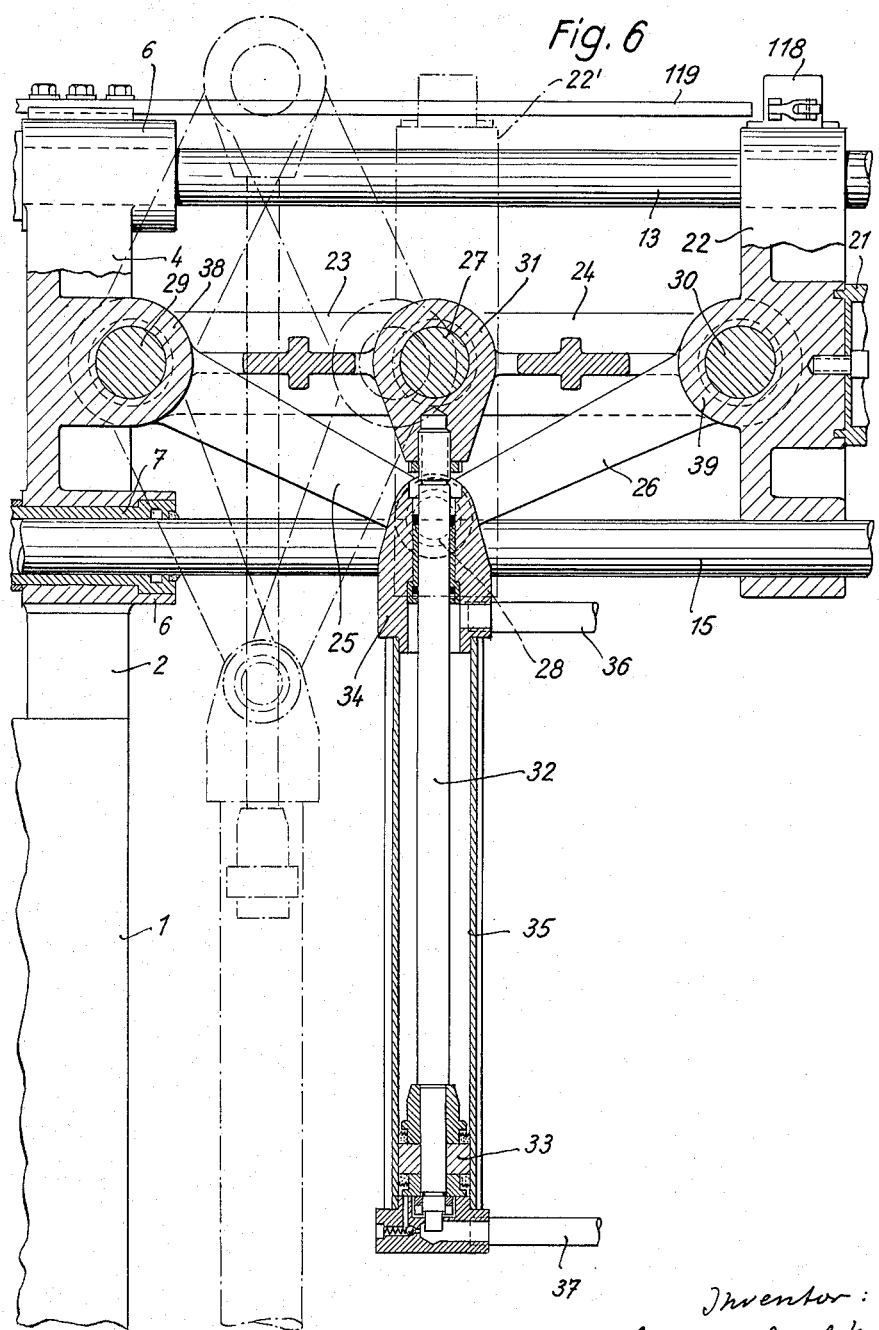

April 12, 1966   L. J. MAURER   3,245,122
APPARATUS FOR AUTOMATICALLY DIE-CASTING WORKPIECES
OF SYNTHETIC PLASTIC MATERIAL
Filed May 1, 1962

Inventor
Ludwig Josef Maurer
by Michael S. Striker
Attorney

United States Patent Office 3,245,122
Patented Apr. 12, 1966

3,245,122
APPARATUS FOR AUTOMATICALLY DIE-CASTING WORKPIECES OF SYNTHETIC PLASTIC MATERIAL
Ludwig Josef Maurer, 45 Hochburgerstrasse, Emmendingen, Baden, Germany
Filed May 1, 1962, Ser. No. 191,596
Claims priority, application Germany, May 2, 1961, M 48,906; July 21, 1961, M 49,775
20 Claims. (Cl. 18—30)

This invention relates to an apparatus for automatically die-casting workpieces of synthetic plastic material, in which the raw material, which is mostly granular, is injected preferably by a conveyor worm through an injection nozzle into the die-casting mould and at the same time heated. The invention relates particularly to those presses for synthetic plastic material which are provided with moulds arranged at one end outside the lower part or base of the apparatus and operate with closing pressures of about 80 tons and more and quantities of material in the order of 80 g. and more and with direct worm injection.

The object of the invention is to produce an apparatus of the aforedescribed type which allows the work to be carried out quickly and nevertheless operates with very high pressures, is of compact construction and composed of relatively small parts which are easy to manufacture.

To achieve this object the invention provides an apparatus for automatically die-casting workpieces of synthetic plastic material, which comprises a divided die-casting mould, a stationary pressure frame carrying one half of said mould and taking up the closing pressure, a second pressure frame carrying the other half of said mould, movable in relation to the stationary frame and applying the closing pressure, and a hydraulically controlled scissors joint arranged between the two frames for exerting the closing pressure.

The stationary pressure frame may preferably consist of two square guide plates interconnected by a plurality of ram-like spacer tubes and forming a substantially rigid frame which in turn is secured to the lower part of the apparatus frame preferably by detachable connecting elements.

The movable frame may consist of a die-clamping plate equipped with an ejecting device for the finished workpieces and of a connecting plate, the two plates being interconnected by four stringer rods to form an aggregate.

The scissors joint may be arranged between the rear guide plate of the stationary pressure frame and the rear plate of the movable frame and consist of two pairs of hinged arms, the scissors joint being actuated by a hydraulically controlled closing cylinder acting on said pairs of hinged arms for opening and closing the two halves of the die-casting mould.

An adjustable plate may be arranged parallel to the connecting plate mounted on the stringer rods of the movable frame and assist in carrying the scissors joint, said adjustable plate being adjustable as regards its distance from the connecting plate by means of a central screw spindle to allow perfect closure of the die-casting moulds in case of different thicknesses of the latter.

According to a further development of the invention the spacer tubes of the stationary pressure frame may be internally constructed as oil passages each of which connects two guide bushes acting as sliding bearings of each stringer rod and surrounds this rod closely in such a manner that an oil pressure sufficient to lubricate the sliding bearings is produced by the movement of the rod and the resultant displacement of the oil particles located in the passage.

A turn bridge carrying the conveyor worm aggregate may advantageously be slidable on the two lower spacer tubes with the aid of a hydraulic propelling cylinder to bring a spraying nozzle on the forward end of the worm aggregate to the injection opening of the die-casting mould between each two injection operations.

The turn bridge is expediently mounted on two bearing parts each comprising a tube supported at each end on sliding sleeves on one of the spacer tubes, and surrounding its tube so closely that an oil pressure sufficient for lubricating its two end sliding sleeves is produced by the movement of the bearing part and the resultant displacement of the oil particles located therein.

The hydraulic propelling cylinder may be adjustable on the lower part of the apparatus to enable worm aggregates of different lengths to be exchangeably fitted.

The worm aggregate expediently comprises a feed passage and a conveyor worm mounted in said feed passage and driven by a hydraulic motor, said aggregate being mounted on the turn bridge to move about a vertical axis to facilitate cleaning and exchanging the worm aggregate.

The conveyor worm may be axially shiftable in the feed passage and its rear end face bears against the piston of an extrusion cylinder effecting the injection into the die-casting mould in order to transmit to this piston its axial displacement caused by the accumulation of transported material in front of the spraying nozzle.

The conveyor worm expediently has a shaft provided on its rear end with a toothed rim corresponding in width to the return movement thereof and meshing with inner wedge teeth on a coupling sleeve effecting the drive.

The extrusion piston advantageously carries a piston rod to the rear free end of which a switch lever is linked which, at the end of the backward movement of the conveyor worm, actuates a limit switch through the intermediary of a movable transmitting element with the object of switching on the hydraulic power for effecting the forward movement of the piston for the actual injection operation.

The distance between the limit switch and the end of the movable transmitting element may expediently be variably adjustable to allow infinite regulation of the volume of material to be injected even during the actual injection operation.

The limit switch may be arranged on a slide element mounted in a spindle box and carrying a radially projecting guide pin which is guided both in a spiral guide slot in the spindle box and also in a guide groove in an outer casing extending parallel to the axis of the spindle box in order to effect an axial displacement of the slide element by turning the spindle box by means of an operating knob.

Finally, the ejecting device arranged on the mould clamping plate may comprise a piston mounted in the ejection cylinder and carrying a piston rod constructed at one end in the form of a ram and provided with a screw thread at its other end on which an adjusting nut with a corresponding screw thread is arranged, said adjusting nut having a projecting tube engaging over a neck on the cylinder head and the stroke of the piston being infinitely regulatable during the ejection of the workpieces by the adjustment of the adjusting nut.

By arranging a movable pressure frame within a stationary pressure frame the movable pressure frame is well guided and a symmetrical flow of force is obtained. As a result tilting of the mould is almost impossible. In addition, this arrangement of the power transmitting elements allows the use of a separate ejector which is easily accsessible and can be provided with independent control.

In the proposed press for synthetic plastic material the spacer tubes of the stationary frame by a special construction of their interior are used additionally for producing the oil pressure necessary for lubricating the stringer rods. This is effected without supplementary accessory means merely by providing each spacer tube with an internal diameter which renders the gap between the inner wall and the rod very narrow, for example 2 to 3 mms., when the length of the spacer tube amounts to 140 cms. It has been found that with such dimensioning the rod movement is sufficient to impart to the oil in the interior of the spacer tube such a movement and/or pressure that the lubrication of the sliding points of the rods is ensured without any additional measures. The same principle is applied also to the bearing part. The gap widths are about the same as in the case of the stringer rods. The relatively short length of the oil passages is sufficient for pressure lubrication because the loading of the bearing part is less than that of the rods.

Arranging the adjusting device for regulating the volume to be injected outside the machine results, on the one hand, in a short constructional length and enables, on the other hand, the infinite regulation of the injecting volume from a switchboard which is independent of the position of the press.

A preferred embodiment of the invention will now be described by way of example and with reference to the accompanying drawings, in which:

FIG. 1 is a side elevational view of a die-casting apparatus seen from the operating side;

FIG. 2 is a top plan view thereof;

FIG. 3 is a vertical section, on a larger scale, through the central portion of the apparatus taken on the line III—III of FIG. 4;

FIG. 4 is a horizontal section taken on the line IV—IV of FIG. 3;

FIG. 5 is a vertical section taken on the line V—V of FIG. 3;

Figure 10:
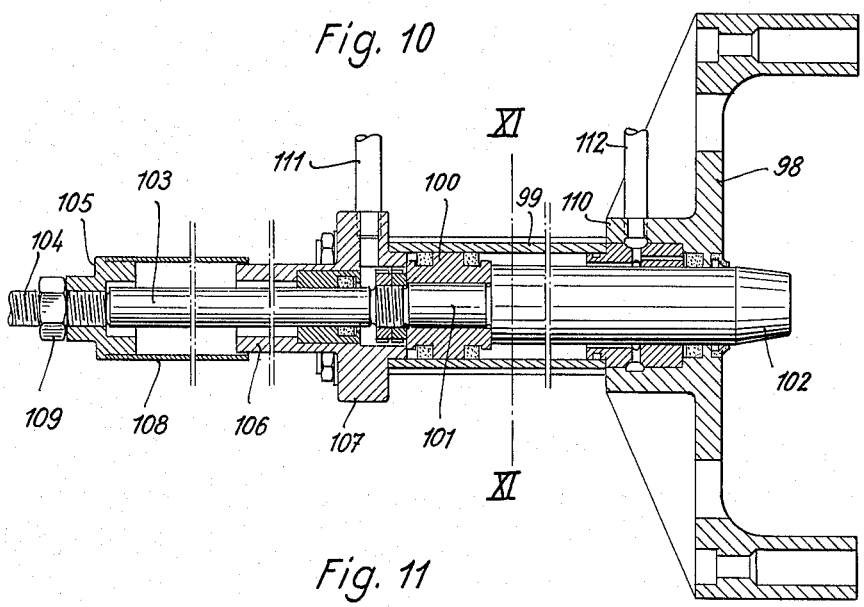
Figure 11:
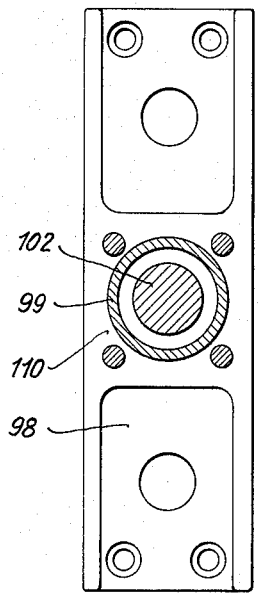
Figure 12:
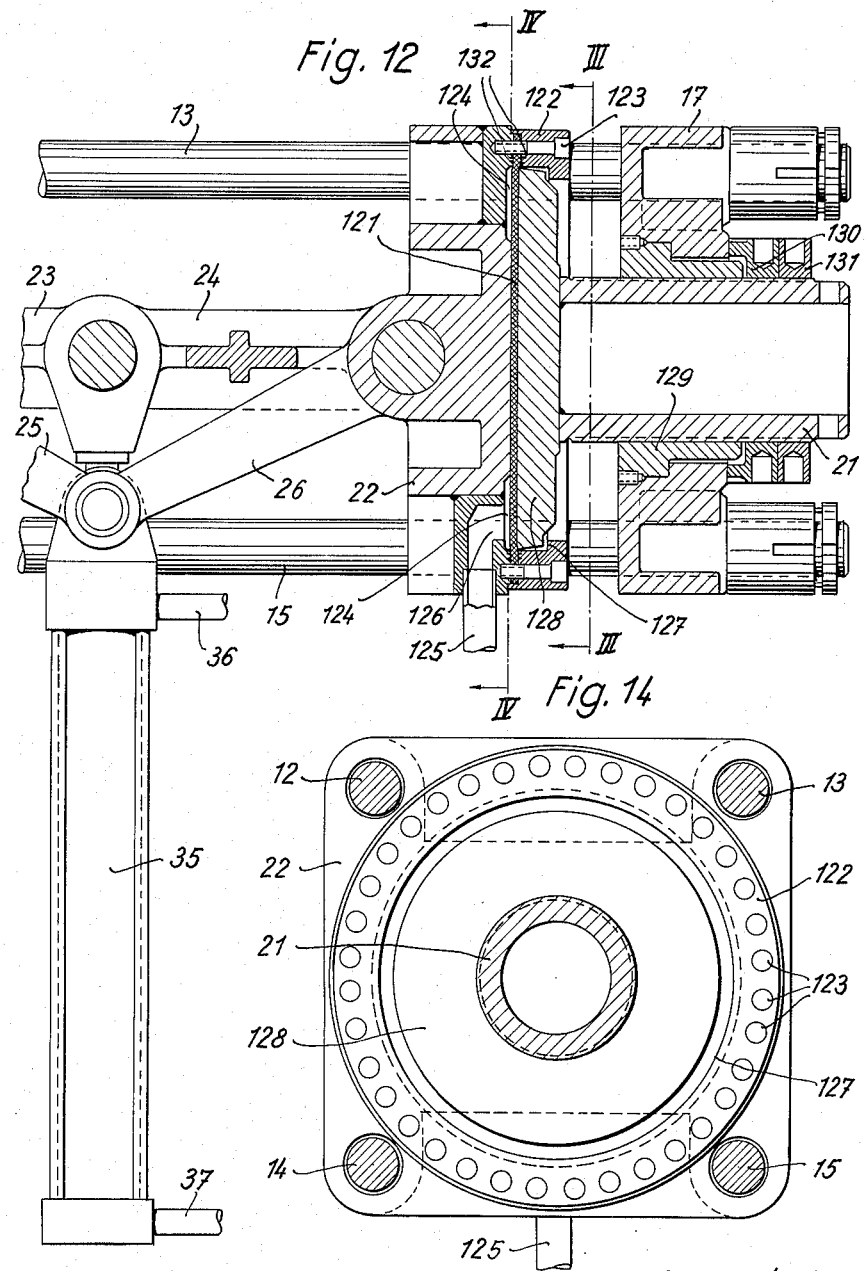
Figure 13:
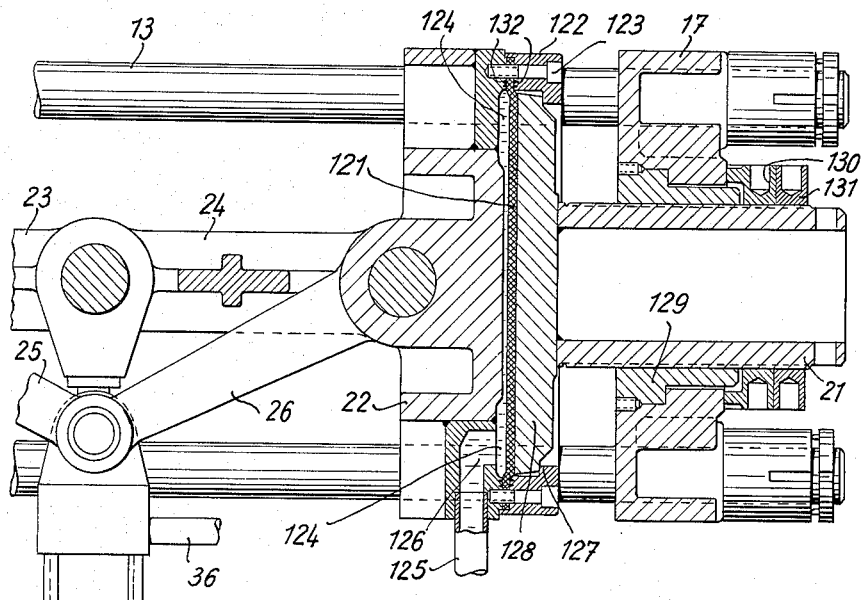

In FIGS. 6 to 11 further details of the machine are shown also on a larger scale;

FIG. 6 is an elevational view showing the scissors joint effecting the opening and closing of the divided die-casting mould;

FIG. 7 is a vertical section through the middle of the spindle box which allows the regulation of the limit switch;

FIG. 8 is a side elevational view partly in section thereof;

FIG. 9 is a cross section taken on the line IX—IX of FIG. 7;

FIG. 10 is a longitudinal section through the middle of the infinitely variable ejector for the finished extrusion cast workpieces;

FIG. 11 is a cross section taken on the line XI—XI of FIG. 10;

FIG. 12 is a vertical longitudinal section through the middle of the rear end of the die-casting apparatus with the interposition of a hydraulic pressure cushion, the apparatus being in the closing position in which the pressure is exerted solely by the scissors joint;

FIG. 13 is a similar longitudinal section but with the apparatus being in the final closing position subsequently effected by the pressure cushion;

FIG. 14 is a vertical section taken on the line XIV—XIV of FIG. 12, and

Figure 15:
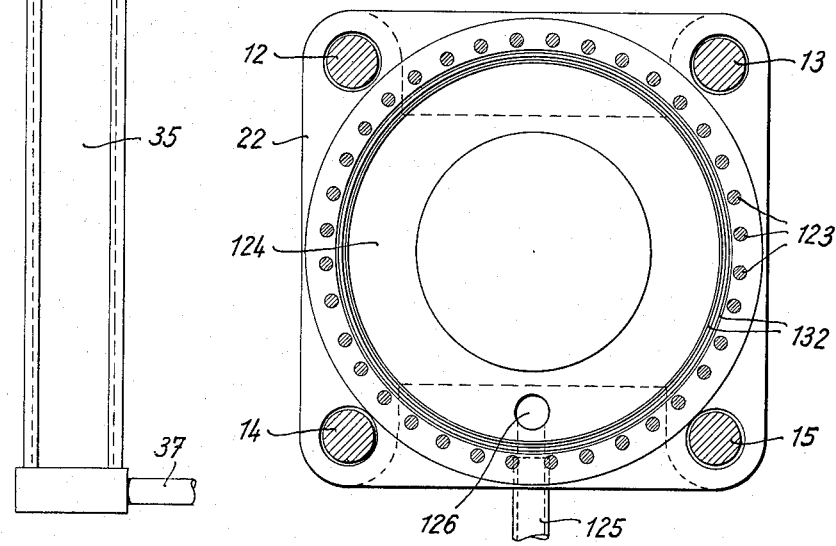

FIG. 15 is a vertical cross section taken on the line XV—XV of FIG. 12.

FIGS. 1 and 2 show an automatic die-casting apparatus consisting of a lower part 1 and an upper part which is held by means of supports 2 provided on the narrow ends of the lower part 1. The upper part consists of two square guide plates 3 and 4 which are mounted on the supports 2 so that they are easily detachable by means of bolts 5 (FIG. 5) and which are provided at each of their four corners with bearing eyes 6. These two square guide plates 3 and 4 are joined to form a unit by means of spacer tubes 8, 9, 10 and 11. For this purpose they are screwed on to guide bushes 7 which are inserted in the respective bearing eyes 6 from the outer side and which for this reason are of corresponding lengths and provided at their ends directed towards the middle of the apparatus with external screw threads. Stringer rods 12, 13, 14 and 15 are axially slidable in the guide bushes 7 and the spacer tubes 8 to 11, at the same time forming a clearance space 44 which is filled with oil through an opening with a screw plug 45 (FIGS. 3 and 4), thereby insuring a practically frictionless sliding of the stringer rods 12, 13, 14 and 15.

These stringer rods 12 to 15 are of such length that they project at both ends beyond the actual upper part of the apparatus and at their two extremities they are interconnected by means of plates 16 and 17, respectively. The front so-called die-clamping plate 16 carries, on the one hand, an ejecting device 18 for the finished workpieces and, on the other hand, one half 19 of the divided die-casting mould, whereas the other half 20 of this mould is fixed on the square guide plate 3. The plate 17 interconnecting the rear ends of the stringer rods 12, 13, 14 and 15 is connected by a screw spindle 21 with an adjustable plate 22 slidable on the stringer rods 12 to 15 and the distance of this adjustable plate 22 from the stationary connecting plate 17 can be differently adjusted by means of the screw spindle 21 in order to enable perfect closing when employing die-casting moulds of different thicknesses. The stringer rods 12 to 15 can be moved to and fro in axial direction by means of a hydraulically controlled scissors joint in order to open and close the divided die-casting mould.

The scissors joint (FIG. 6) is composed of two pairs of hinged arms 23, 24 and 25, 26, the pair of arms 23 and 24 being hingedly interconnected by a hinge pin 27 and the pair of arms 25 and 26 by a hinge pin 28. The hinged arms 23 and 25 are also connected to a bearing 38 of the guide plate 4 by means of a hinge pin 29 and the hinged arms 24 and 25 to the bearing 39 of the adjustable plate 22 by means of a hinge pin 30. The hinge pin 27 likewise carries a piston suspension 31 on which a piston rod 32 having a piston 33 is mounted, while the hinge pin 28 carries a cylinder guide head 34 associated with a closing cylinder 35. Conduits 36 and 37 connect the closing cylinder 35 at its upper and lower ends with the hydraulic plant serving for actuating the scissors joint.

On the two lower spacer tubes 10 and 11 (FIGS. 3 and 4) a so-called turn bridge 40 is slidably mounted. It is for this purpose equipped on both sides with a bearing part 41, the two bearing parts 41 being slidably mounted on the spacer tubes 10 and 11 each by means of two sliding sleeves 42, forming at the same time an annular gap 43 between the spacer tubes 10 and 11 and the bearing parts 41, which is likewise filled with oil. The oil is introduced through openings in the central portions of the bearing parts 41, each of the openings being provided with a screw plug 46. The turn bridge 40 is provided in the middle with a turntable 47 on which the so-called worm aggregate is rotatably mounted in a gear box 48. This gear box 48 is fixed on the turn bridge 40 merely by means of four screw bolts 49 having heads 50 mounted in an annular guide groove 51 of the turn bridge 40 and thus enables the worm aggregate to be both swung and also easily exchanged by unscrewing the four nuts.

This worm aggregate consists substantially of a conveyor worm 53 rotatably mounted in the gear box 48 and a feed passage 52 extending from the front end thereof, which worm is driven by a hydraulic motor 54 (FIG. 2) through the intermediary of a toothed wheel 55 (FIG. 3). This toothed wheel 55 is keyed on a coupling sleeve 56 which is provided with a central bore 57 and the conveyor worm 53 extends with a shaft 58 through the control bore 57. This shaft 58 is provided at its rear end with wedge teeth which engage in corresponding inner wedge teeth 59 provided on the rear end of the coupling sleeve 56 to enable the conveyor worm 53 to shift in axial direction towards the rear. An extrusion cylinder 61 having a piston 60 is arranged at the rear end of the worm shaft 58 and when the latter moves rearwardly it presses with its rear end face against the piston 60 of the extrusion cylinder 61 and also presses the piston 60 towards the rear. Electric heating elements 62 are arranged around the feed passage 52 and bring the material transported by the conveyor worm 53 to the necessary temperature. To enable the moulding compound to be injected into the half 20 of the die-casting mould, the front end of the feed passage 52 is constructed as a spraying nozzle 63.

Under the turn bridge 40 a propelling cylinder 65 is arranged on a holder 64 adjustably fixed on the lower part 1. The object of this propelling cylinder 65 is to move the turn bridge 40 with the spraying nozzle 63 of the feed passage 52 to the injection hole of the half 20 of the die-casting mould. For this purpose the propelling cylinder 65 has a piston rod 66 which is connected with the turn bridge 40 by means of a connecting piece 67, and a piston 68 which is operated by the hydraulic plant (not shown in the drawings) through two flexible conduits 69 and 70, while the control is effected by electric means through the intermediary of a push switch 71 provided with a roller 73 and a control rail 72 mounted on the turn bridge 40.

As, depending upon the size of the workpiece to be produced, the quantity of material necessary for each spraying operation is different, and in dimensioning the feed passage 52 a certain relationship must be maintained between the length and diameter of the passage, several fixation holes 77 are provided for screw bolts 78 securing the holder 64 on the upper side of the bottom part 1 at different distances from the front guide plate 3, so that, for example, when inserting a small conveyor worm the holder 64 can be fixed further towards the front.

The extrusion cylinder 61 has for its object to press the conveyor worm 53 after it has run back, forward again at the proper time in order to effect the actual injection moulding. This is likewise effected with the aid of the hydraulic plant by pressing oil into the extrusion cylinder 61 through a conduit 74. This operation is initiated by a so-called limit switch 76 which switches on the hydraulic plant by electrical means and is preferably arranged under a switchboard 75 provided on the lower part 1. For this purpose the extrusion cylinder 61 has a piston rod 79 which is hingedly connected to a switch lever 80 which is pivoted by means of a holder 95 on the extrusion cylinder 61 and operates a Bowden cable 82 by means of a second lever arm 81 thereon. This Bowden cable 82 extends to below the limit switch 76 (FIG. 7) which is then switched off after the extrusion piston 60 (FIG. 3) has moved back a certain distance.

To enable the return movement of the conveyor worm 53 to be varied according to the quantity of material introduced even during the production, it is necessary that the hydraulic plant can be switched on after the piston 60 has reached any position in the extrusion cylinder 61. This is attained by the fact that the limit switch 76 (FIGS. 7 to 9) is adjustable in relation to the end 83 of the Bowden cable 82, which results in the limit switch 76 being actuated either earlier or later. This problem is solved in that the limit switch 76 is arranged on a slide element 85 shiftable in vertical direction within a spindle box 84. The limit switch 76 is provided with a press-button 87 and the slide element 85 is equipped with a central bore 86 which allows the Bowden cable end 83 to act on the press-button 87 of the limit switch 76 without hindrance. A second bore 88 is provided in the slide element 85 for the current feed wire to the limit switch 76. The spindle box 84 is rotatably mounted in an outer casing 89 and carries on its upper end a pivot pin 90 which projects upwardly through the switchboard 75 and in turn is provided with an operating knob 91. Fitted laterally on the slide element 85 is a guide pin 92 which projects through a spiral guide slot 93 in the spindle box 84 and engages with its free end in a groove 94 extending vertically in the outer casing 89. Thus, according to the direction of rotation it is possible with the aid of the operating knob 91 to raise or lower in relation to the end 83 of the Bowden cable 82 the slide element 85, which is secured against participating in the rotation by the engagement of the guide pin 92 in the groove 94, by the spiral guide 93.

The ejecting device 18 illustrated in FIGS. 1 and 2 and on a larger scale in FIGS. 10 and 11 has for its object to eject the finished injected workpiece from the half 19 of the two-piece die-casting mould, the workpiece remaining in this half 19 after the mould has opened. To effect this, it is particularly important to avoid any hard blow or jolt on the workpiece because this would result in a large number of rejects in the production. This condition is attained in that the ejection of the finished workpiece is effected by a hydraulic ejecting device which in addition renders it possible to vary the hardness of the blow as desired.

This ejecting device consists substantially of a holding bridge 98 bolted on the plate 16 and carrying an ejector cylinder 99 with a piston 100 having a piston rod 101 which is constructed at one end as a ram 102 effecting the ejecting of the finished workpiece from the mould, while the piston rod is provided with a screw thread 104 at its other end 103. Mounted on this screw thread 104 is an adjusting nut 105 which is provided with a protecting tube 108 engaging over a neck 106 of the cylinder head 107. This tube serves at the same time as abutment for limiting the stroke of the piston during the ejection of the workpiece and the piston stroke can be varied as desired by adjusting the nut 105 which can be locked in any desired position by a counter nut 109. At the two ends of the ejector cylinder 99 connecting conduits 111 and 112 leading to the hydraulic plant are arranged both in the cylinder head 107 and in a bearing 110 of the holding bridge 98.

This die-casting apparatus operates in the following manner:

After the material to be used for die-casting, which is mostly granulated, has been introduced into the feed passage 52 through a charging aperture 97 with the aid of an easily removable hopper 96 (FIGS. 1 to 3), the conveyor worm 53 conveys this material in forward direction up to the space preceding the spraying nozzle 63, the material being brought to the necessary temperature by the heating elements 62 as it travels along. The material collects in this space and thus at the same time forces back the conveyor worm 53. The conveyor worm 53 in turn presses the piston 60 with the aid of its shaft 58 so far towards the rear in the extrusion cylinder 61 until the piston rod 79, through the intermediary of the switch levers 80, the lever arm 81 and the Bowden cable 82, actuates the limit switch 76 (FIGS. 7 to 9) with the object of switching on the hydraulic plant.

During this time oil is pumped by the hydraulic plant, which is controlled by a switch clock with time relay, through the conduit 36 (FIG. 6) into the closing cylinder 35, thereby pressing the piston 33 downwards and spreading the hinged arms 23 to 26 out of the positions shown in dot and dash lines into the positions shown in solid lines. As a result the adjustable plate 22 is pressed out of the position 22¹ shown in dot and dash lines into the position shown in solid lines and the stringer rods 12 to 15, through the intermediary of the plate 16 stationarily arranged on their other end, bring the two halves 19 and 20 of the die-casting mould into the closed position.

Controlled by the switch clock, the hydraulic plant also pumps oil through the conduit 70 (FIG. 3) into the propelling cylinder 65 with the result that the turn bridge 40 together with the spraying nozzle 63 is moved close to the injection hole of the half 20 of the die-casting mould by means of the piston 68, the piston rod 66 and the connecting piece 67. The oil feed into the propelling cylinder 65 is then cut off by the push switch 71 and the control rail 72.

Due to the hydraulic plant being switched on by the limit switch 76 through the intermediary of the Bowden cable 82 the actual injecting operation is effected in that the oil from the hydraulic plant flows through the conduit 74 into the extrusion cylinder 61 and consequently presses the piston 60 and thereby also the conveyor worm 53 towards the front. At the same time the material having bceome liquid through the heating is pressed through the spraying nozzle 63 into the mould. At the end of this operation the propelling cylinder 65 controlled by the switch clock again becomes operative and moves the worm aggregate back somewhat until the commencement of the next die-casting operation, so as to avoid excessive heating of the die-casting mould.

The hydraulic plant, again being controlled by the switch clock, now pumps oil into the closing cylinder 35 (FIGS. 1 and 6), but this time through the conduit 37 with the result that the piston 33 is pressed upwards and the scissors joint composed of the hinged arms 23–26 is again brought into the open position indicated in dot and dash lines. Hereby the stringer rods 12 to 15 and consequently also the plate 16 are moved forward causing the opening of the divided die-casting mould. The oil feed from the hydraulic plant is hereby actuated by a switch 113 arranged on the adjustable plate 22 and equipped with a roller 114 and cooperating with a control rail 115. This control rail 115 is arranged on the guide plate 4 and can be adjusted with the aid of a guide slot 116 therein and fixation bolts 117 in order to be able in this way to limit the path of opening movement according to the thickness of the mould.

A second switch 118 arranged on the adjustable plate 22 is also actuated by a control rail 119 arranged on the guide plate 4 during the opening movement and switches on the oil feed from the hydraulic plant through the conduit 111 (FIG. 10) with the result that the piston 100 and consequently also the ejector ram 102 are moved in the direction towards the mould and thereby the finished workpiece is ejected. During the subsequent closing of the mould the oil feed is switched over by the switch 118 (FIG. 2) via the conduit 112 (FIG. 10) into the ejector cylinder 99 with the result that the ram 102 returns into its initial position. The control rail 119 is also equipped with a guide slot 120 in order to enable the timing of the ejection to be varied by suitably adjusting the control rail 119.

When running the apparatus above described it has been found that a quick opening and closing of the two halves of the die-casting mould is obtained by the use of the scissors joint, but the closing pressure produced is often not sufficient, even in the case of a very accurate adjustment of the necessary distance between the adjusting plate and the pulling plate, to achieve an absolutely tight closure of the two mould halves, because, on the one hand, during the closing operation a stretching occurs in the stringer rods and spanning in the tools and the plates carrying the scissors joint and, on the other hand, the hinged arms of the scissors joint only exert a very slight spreading effect on the two plates during the last phase of their closing movement when the actual closing pressure is required.

In order to overcome this objection, the invention provides for supplementing the closing mechanism effecting the opening and closing of the two halves of the die-casting mould, a hydraulic pressure cushion between this mechanism and the elements effecting the closing of the mould, which cushion exerts the actual closing pressure after the closing mechanism has reached the closing position.

By this combination of a scissors joint with a pressure cushion as closing device for the two mould halves a far greater closing pressure is attained without appreciably slowing down the working speed.

This inventive idea is hereinafter described by way of example with reference to FIGS. 12 to 15 of the accompanying drawings.

As can be seen from these figures of the drawings a hydraulic pressure cushion is arranged between the plate 17 fixed on the stringer rods 12 to 15 and the plate 22 adjustably mounted on these stringer rods 12 to 15. This cushion is composed of a diaphragm 121 preferably of Vulkollan which is fixed on the rear side of the adjustable plate 22 by means of a holder ring 122 and screws 123. This adjustable plate 22 is provided on its rear side with an annular recess 124 which serves for allowing the oil coming from the hydraulic plant through a feed conduit 125 and then passing out from an angular bore 126, to act quickly and uniformly on the entire surface of the diaphragm 121. The holder ring 122 is equipped with an inner flange 127 which serves as abutment for a piston plate 128 arranged on this holder ring 122 for the purpose of limiting the piston stroke. The piston plate 128 itself is made adjustable as regards its distance in relation to the pulling plate 17 by means of the screw spindle 21 and a nut 129 firmly mounted in the pulling plate 17, while two counter nuts 130 and 131 then secure the adjustment made.

With the object of more tightly sealing the piston space both the adjusting plate 22 and also the holder ring 122 are each provided with annular grooves 132 on the surfaces in contact with the diaphragm.

The closing of the two mould halves (not shown on the drawings) first takes place in the manner above-described through the action of the scissors joint composed of the hinged arms 23 to 26, in that oil from the hydraulic plant is forced through the conduit 36 into the closing cylinder 35 until the hinged arms 23 and 24 form a straight line (FIG. 12). The result is that the plate 22 and consequently the plate 17 with the stringer rods 12 to 15 are moved towards the right through the intermediary of the piston plate 128 and the screw spindle 21. Thereupon the pressure cushion proposed by the invention becomes operative in that oil is pressed into the annular pressure chamber 124 from the hydraulic plant through the feed conduit 125. As a result the diaphragm 12 and with it the piston plate 128 carry out a stroke which is transferred through the screw spindle 21 on to the plate 17 and the stringer rods 12 to 15 and thus produces a further movement thereof towards the right (FIG. 13). By this additional stroke the stretching of the rods and the spanning of tthe tool parts and the guide plates are compensated and an absolutely tight closure of the mould parts is attained.

The opening of the mould halves is then effected in reverse sequence in that first the oil or the like is conducted back through the conduit 125 from the pressure cushion to the hydraulic plant and only then is the scissors joint brought back into the open position in a known manner by the closing cylinder 35.

Instead of employing the diaphragm 121 as packing element, the piston plate 128 may be directly provided with a packing sleeve on its outer periphery, the holder ring 122 then practically taking over the functions of a cylinder in which the piston plate can carry out its short stroke movements.

The inner flange 127 of the holder ring 122 not only serves for limiting the stroke of the piston plate 128, but also indirectly allows an adjustment of the piston force acting on the mould. This is effected in the following manner: If the piston plate 128 is adjusted through the intermediary of the screw spindle 21 when the mould is closed so that the entire stroke is available, the whole piston force can be brought to bear on the mould. This takes place with elastic deformation of the stringer rods 12 to 15. The piston stroke must therefore correspond to the elastic deformation (expansion). If now the piston plate 128 is adjusted when the mould is closed so that it reaches the abutment formed by the inner flange 127 before termination of the expansion of the stringer rods 12 to 15 occurring at maximum load, the entire piston force does not act on the mould but a portion thereof is transmitted to the stationary frame via the holder ring 122. Only the remaining portion of the piston force will then be transmitted on to the mould through the intermediary of the stringer rods.

I claim.

1. An apparatus for automatically die-casting workpieces of a synthetic plastic material, comprising a divided die-casting mold, a stationary pressure frame carrying one half of said mold and taking up the closing pressure, a second pressure frame carrying the other half of said mold and movable in relation to said stationary frame for applying the closing pressure, a hydraulically controlled toggle joint means arranged between said frame for exerting the closing pressure, said stationary frame including two square plates, and a plurality of spacer tubes interconnecting said square plates, detachable connecting elements for connecting said stationary frame to the base of the apparatus, a turn bridge mounted on said spacer tubes for sliding movement, a conveyor worm aggregate including an injection nozzle at its forward end, and a hydraulic cylinder and piston means for moving said aggregate for placing said nozzle at an injection opening of said die-casting mold.

2. An apparatus as claimed in claim 1, wherein the turn bridge is mounted on two bearing parts each comprising a tube supported at each end on sliding sleeves on one of the spacer tubes, and surrounding its tube so closely that an oil pressure sufficient for lubricating its two end sliding sleeves is produced by the movement of the bearing part and the resultant displacement of the oil particles located therein.

3. An apparatus as claimed in claim 1, wherein the hydraulic propelling cylinder is adjustable on the lower part of the apparatus to enable worm aggregates of different lengths to be exchangeably fitted.

4. An apparatus as claimed in claim 3, wherein the worm aggregate comprises a feed passage and a conveyor worm mounted in said feed passage and driven by a hydraulic motor, said aggregate being mounted on the turn bridge to move about a vertical axis to facilitate cleaning and exchanging the worm aggregate.

5. An apparatus as claimed in claim 4, wherein the conveyor worm is axially shiftable in the feed passage and its rear end face bears against the piston of an extrusion cylinder effecting the injection into the die-casting mould in order to transmit to this piston its axial displacement caused by the accumulation of transported material in front of the spraying nozzle.

6. An apparatus as claimed in claim 5, wherein the extrusion piston carries a piston rod to the rear free end of which a switch lever is linked which, at the end of the backward movement of the conveyor worm, actuates a limit switch through the intermediary of a movable transmitting element with the object of switching on the hydraulic power for effecting the forward movement of the piston for the actual injection operation.

7. An apparatus as claimed in claim 6, wherein the distance between the limit switch and the end of the movable transmitting element is variably adjustable to allow infinite regulation of the volume of material to be injected even during the actual injection operation.

8. An apparatus as claimed in claim 6, wherein the limit switch is arranged on a slide element mounted in a spindle box and carrying a radially projecting guide pin which is guided both in a spiral guide slot in the spindle box and also in a guide groove in an outer casing extending parallel to the axis of the spindle box in order to effect an axial displacement of the slide element by turning the spindle box by means of an operating knob.

9. An apparatus as claimed in claim 4, wherein the conveyor worm has a shaft provided on its rear end with a toothed rim corresponding in width to the return movement thereof and meshing with inner wedge teeth on a coupling sleeve effecting the drive.

10. An apparatus for automatically die-casting workpieces of a synthetic plastic material, comprising a divided die-casting mold, a stationary pressure frame carrying one half of said mold and taking up the closing pressure, a second pressure frame carrying the other half of said mold and movable in relation to said stationary frame for applying the closing pressure, a closing mechanism arranged between said frames for exerting pressure so as to open and close the mold halves, and a hydraulic pressure cushion means arranged between said closing mechanism and said movable frame and adapted to exert closing pressure after said closing mechanism has reached its closing position in which said mold halves abut each other, said pressure cushion means comprising a diaphragm, said movable frame including a pair of end members and rods connecting said end members, one end member being connected to said closing mechanism and an adjustable piston plate mounted on said one end member and carrying said diaphragm.

11. An apparatus as claimed in claim 10, wherein the diaphragm is fixed on its periphery by the holder ring on the rear side of the adjustable plate connected with the closing mechanism.

12. An apparatus as claimed in claim 11, wherein the holder ring has an inner flange serving as abutment for limiting the stroke of the piston plate and thus indirectly enabling the piston force acting on the mould to be adjusted.

13. An apparatus as claimed in claim 1, wherein both the adjustable plate and the holder ring are provided with at least one groove on the surfaces in contact with the diaphragm.

14. An apparatus as claimed in claim 10, wherein the rear side of the adjustable plate carrying the diaphragm is provided with an annular recess which allows the oil pressure to act quickly and uniformly on the entire surface of the diaphragm.

15. In a die-casting apparatus, in combination, a base; a stationary frame on said base comprising two spaced first end members and first connecting means connecting said first end members; a movable frame comprising two second end members disposed outwardly of said first end members, and second connecting means connecting said second end members and being guided for movement in said first end members so that each of said second end members moves toward the respective adjacent first end member when the other second end member moves away from the respective adjacent first end member; a first stationary mold half mounted on one of said first end members and a movable mold half mounted on the respective adjacent second end member, said mold halves forming a mold; and operating means mounted between the other adjacent first and second end members and including means abutting the same for moving said movable frame and said movable mold half relative to said stationary frame and to said stationary mold half so that said mold is opened and closed.

16. In a die-casting apparatus, in combination, a base having ends; a stationary frame on said base comprising two spaced first end members and first horizontal connecting means connecting said first end members, one of said first end members being located at one of said ends of said base; a movable frame comprising two second end members disposed outwardly of said first end members, and second horizontal connecting means connecting said second end members and being guided for movement in said first end members so that each of said second end members moves toward the respective adjacent first end member when the other second end member moves away from the respective adjacent first end member; a stationary mold half mounted on said one first end member and a movable mold half mounted on the respective adjacent second end member so that said mold halves form a mold located outside of said base; operating means mounted between the other adjacent first and second end members and including means abutting the same for moving said movable frame and said movable mold half relative to said stationary frame and to said stationary mold half so that said mold is opened and closed; and a horizontal injection unit disposed between said first end member and cooperating with said stationary mold half to inject material into said mold when the same is closed.

17. In a die-casting apparatus, in combination, a base; a stationary frame on said base comprising two spaced first end members and first connecting means including a plurality of parallel elongated tubes connecting said first end members; means for attaching said first end members to said base in a manner permitting a slight resilient longitudinal compression and expansion of said tubes of said stationary frame; a plurality of bearing members respectively mounted in said first end members and at the ends of said tubes, bearing members at opposite ends of each tube forming an oil chamber in said tube between said bearing members; a movable frame comprising two second end members disposed outwardly of said first end members, and second connecting means including a plurality of parallel elongated rods respectively passing through said elongated tubes connecting said second end members and being guided for movement in said bearing members so that one of said second end members moves toward the respective adjacent first end member when the other second end member moves away from the respective adjacent first end member, the movment of said rods in said bearing members and tubes causing displacement of oil from said oil chambers into said bearing members; a stationary mold half mounted on one of said first end members and a movable mold half mounted on the respective adjacent second end member, said mold halves forming a mold; and operating means mounted between the other adjacent first and second end members for moving said movable frame and said movable mold half relative to said stationary frame and to said stationary mold half so that said mold is opened and closed.

18. In a die-casting apparatus, in combination, a base; a stationary frame on said base comprising two spaced first end members and first connecting means including a plurality of parallel elongated tubes connecting said first end members; means for attaching said first end members to said base in a manner permitting a slight resilient longitudinal compression and expansion of said tubes of said stationary frame; a movable frame comprising two second end members disposed outwardly of said first end members, and second connecting means including a plurality of parallel elongated rods respectively passing through said elongated tubes connecting said second end members and being guided for movement in said tubes so that one of said second end members moves toward the respective adjacent first end member when the other second end member moves away from the respective adjacent first end member; a stationary mold half mounted on one of said first end members and a movable mold half mounted on the respective adjacent second end member, said mold halves forming a mold; operating means mounted between the other adjacent first and second end members for moving said movable frame and said movable mold half relative to said stationary frame and to said stationary mold half so that said mold is opened and closed; an injection unit mounted on selected tubes of said tubes between said first end members and being movable along said tubes between an inoperative position and an injection position engaging said stationary mold half to inject material into said mold; and means for moving said injection unit between said positions.

19. In a die-casting apparatus, in combination, a base; a stationary frame on said base comprising two spaced first end members and first connecting means connecting said first end members; a movable frame comprising two second end members disposed outwardly of said first end members, and second connecting means connecting said second end members and being guided for movement in said first end members so that each of said second end members moves toward the respective adjacent first end member when the other second end member moves away from the respective adjacent first end member; a stationary mold half mounted on one of said first end members and a movable mold half mounted on the respective adjacent second end member, said mold halves forming a mold; an ejection unit mounted on the second end member which carries said movable mold half and including an ejector member movable into said movable mold half, and control means for advancing and retracting said ejector member independently of the relative position of said mold halves and of the movements of said movable mold half; and operating means mounted between the other adjacent first and second end members and including means abutting the same for moving said movable frame and said movable mold half relative to said stationary frame and to said stationary mold half so that said mold is opened and closed.

20. In a die-casting apparatus, in combination, a base; a stationary frame on said base comprising two spaced first end members and first connecting means connecting said first end members so that each of said second end second end members disposed outwardly of said first end members, and second connecting means connecting said second end members and being guided for movement in said first end members so that each of said second end members moves toward the respective adjacent first end member when the other second end member moves away from the respective adjacent first end member; a stationary mold half mounted on one of said first end members and a movable mold half mounted on the respective adjacent second end member, said mold halves forming a mold on a first pair of first and second end members; and operating means mounted between the second pair of adjacent first and second end members for moving said movable frame and said movable mold half relative to said stationary frame and to said stationary mold half so that said mold is opened and closed, said operating means including mechanical means comprising an element abutting one end member of said second pair, a carrier movable along second connecting means, and drive means for moving said carrier away from said element, and hydraulic means comprising diaphragm means mounted on said carrier forming a chamber with the same and abutting the other end member of said second pair, and means for supplying hydraulic pressure fluid to said chamber after said drive means have moved the second end member of said second pair for closing said mold so that great pressure is applied to said movable frame and said movable mold half in the closed position of said mold.

(References on following page)

References Cited by the Examiner

UNITED STATES PATENTS

| | | | |
|---|---|---|---|
| 18,502 | 10/1857 | De Yampert | 100—272 |
| 1,952,241 | 3/1934 | Eckert | 18—30 |
| 2,309,460 | 1/1943 | Lester | 18—30 |
| 2,351,582 | 6/1944 | Bohrer | 18—30 |
| 2,416,348 | 2/1947 | Renier | 18—30 |
| 2,629,132 | 2/1953 | Wilcox et al. | 18—30 |
| 2,671,246 | 3/1954 | Lester | 18—30 |
| 2,689,978 | 9/1954 | Boger | 18—30 |
| 2,862,238 | 12/1958 | Cuzzi | 18—30 |
| 2,988,778 | 6/1961 | Chaze et al. | 18—30 |
| 3,000,429 | 9/1961 | Warnken | 100—272 |
| 3,008,189 | 11/1961 | Harvey | 18—30 |
| 3,020,591 | 2/1962 | Breher et al. | 18—30 |
| 3,081,486 | 3/1963 | Skyorc | 18—2 |

FOREIGN PATENTS

| | | |
|---|---|---|
| 1,223,038 | 6/1960 | France. |
| 929,693 | 6/1955 | Germany. |
| 21,331 | 10/1901 | Switzerland. |

J. SPENCER OVERHOLSER, *Primary Examiner.*

MICHAEL V. BRINDISI, WILLIAM J. STEPHENSON,
*Examiners.*

L. D. RUTLEDGE, W. L. McBAY, *Assistant Examiners.*